(No Model.)

J. T. LINSEY, B. F. KERNODLE & I. SHELLEY.
GATE HINGE.

No. 546,234. Patented Sept. 10, 1895.

Witnesses

Inventors
Joseph T. Linsey
Benjamin F. Kernodle
Isaac Shelley
By their Attorney

UNITED STATES PATENT OFFICE.

JOSEPH T. LINSEY, BENJAMIN F. KERNODLE, AND ISAAC SHELLEY, OF JAMESTOWN, INDIANA.

GATE-HINGE.

SPECIFICATION forming part of Letters Patent No. 546,234, dated September 10, 1895.

Application filed March 23, 1895. Serial No. 542,941. (No model.)

*To all whom it may concern:*

Be it known that we, JOSEPH T. LINSEY, BENJAMIN F. KERNODLE, and ISAAC SHELLEY, citizens of the United States, residing at Jamestown, in the county of Boone and State of Indiana, have invented new and useful Improvements in Gate-Hinges, of which the following is a specification.

Our invention relates to certain new and useful improvements in gate-hinges; and it consists in an adjustable sliding piece to which the gate is hinged or hung and whereby said gate is held in any vertical position, which will be hereinafter more fully set forth.

The object of our invention is to provide means whereby a swinging gate may be elevated vertically or lowered to swing at a fixed distance from the ground, and which invention admits of variations in height of the gate from the ground according as the circumstances may require, and to provide means whereby the said sliding piece automatically engages or is held to maintain the gate in any required position vertically.

We attain these objects by means of the hinge illustrated in the accompanying drawings, in which similar reference-numerals designate like parts throughout the several views.

Figure 1:
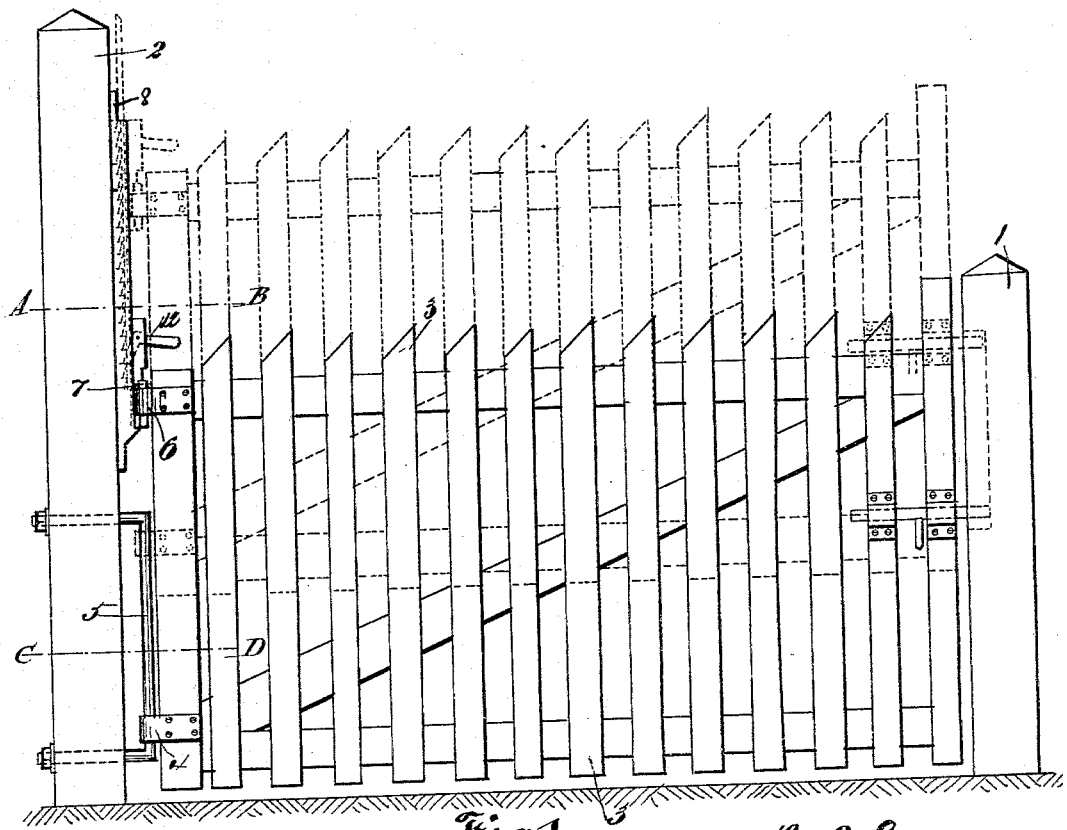
Figure 2:
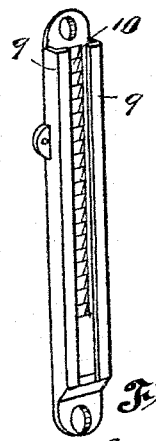
Figure 3:
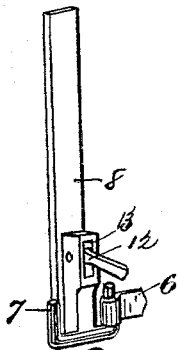
Figure 4:
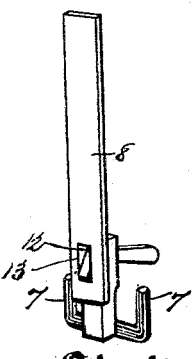
Figure 5:
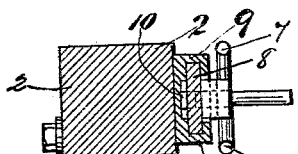
Figure 6:
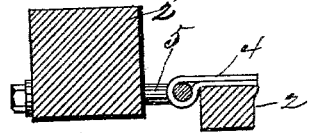

Figure 1 is a front elevation of a swinging gate, showing our adjustable hinge applied thereto. Fig. 2 is a perspective view of the rack and guide-piece of the sliding hinge-bar. Fig. 3 is a perspective view of the sliding hinge-bar. Fig. 4 is a similar view showing the rear side thereof. Fig. 5 is a sectional plan view of the gate-post, taken through the line A B, (see Fig. 1;) and Fig. 6 is a similar view of the said post, taken through the line C D. (See also Fig. 1.)

The outer or latch-engaging post 1 and the inner or hinge-supporting post 2 are each embedded and firmly secured in any suitable manner in the ground, and between these the swinging gate 3, which may be of any suitable style, is swung or "hung." The bottom hinge of the gate 3 is composed of the plate member 4 and the rod 5, whereon the said plate member is pivoted and which is prolonged upwardly and vertically and has its bent ends firmly secured in the hinge-post 2. The upper hinge is composed of the plate member 6, secured to the gate, and the pin-carrying bar 8, to which are either firmly secured or on which are formed integrally the pins 7. We prefer to provide two hinge-pins 7, which project from the sides of the pin-carrying plate or bar and are provided for the purpose of adapting said pin-carrying bar to any gate, no matter the direction of its swing.

The slide-bar guide or way 9 and the rack 10 are formed in one integral piece and is adapted to receive the pin-carrying bar 8, wherein it slides, said guideway being firmly secured to post 2 in any suitable manner. The dog 12 is fulcrumed in the slot 13, formed in the slide or hinge-pin-carrying bar 8, and has its longer outwardly-projecting end of a sufficient length and weight to insure the engaging end of the dog to engage the rack-teeth 10, and said handle is at a convenient distance from the ground to be reached and disengaged to permit the gate to be lowered.

When it is required to elevate the gate to any position from a lower position, as shown in full lines in Fig. 1, the gate 3 is grasped and lifted on its hinges to the required height, as the height shown in dotted lines in Fig. 1, in which position it is locked and held, immediately the gate is disengaged by the person holding it, by the dog 12, which operates automatically. It is obvious that the gate may be raised from its lowest position to its highest position and securely retained in such position just as readily as in any intermediate position between its extreme lower and higher positions, which is a very desirable feature in farm-gates and is needful for the many purposes to which a farmer may apply them.

To permit the gate to descend or drop from its higher to its lower position or to any intermediate position between its higher and lower positions, the handle of the dog 12 is simply raised to disengage the dog from the rack 10, and may be held till the gate has descended to the required height from the ground.

We are aware that previous to our invention various means have been employed by which swinging gates have been hung and adjusted in such a manner as to be elevated on their hinges and held at various heights from the ground. These we do not claim, broadly, as our invention; but

What we claim as new and useful, and desire to cover by Letters Patent of the United States therefor, is—

In a swinging gate hinge, the combination with a swinging gate and its post, of a lower hinge composed of a rod member vertically secured on said post and a plate member secured on said gate and adapted to slide and to turn or pivot on said rod, and an upper hinge composed of a guide vertically secured on said post and having interior rack teeth, a bar adapted to slide in said guide piece and having an engaging dog pivoted thereon, and vertically projecting pins formed integral thereon, one of which is in vertical alignment with said lower vertical rod and a plate member secured on said gate and adapted to pivot only on one of said pins, all substantially as and for the purpose set forth.

In testimony whereof we have hereunto set our hands in the presence of two subscribing witnesses.

JOSEPH T. LINSEY.
BENJAMIN F. KERNODLE.
ISAAC SHELLEY.

Witnesses:
H. S. HEADY,
N. C. HEADY.